(No Model.) 4 Sheets—Sheet 1.

F. W. FIX.
MACHINE FOR MOLDING CONFECTIONS.

No. 518,059. Patented Apr. 10, 1894.

WITNESSES:
E. L. Bendixen
J. J. Laass

INVENTOR
Frederick W. Fix
By E. Laass
his ATTORNEY.

(No Model.) 4 Sheets—Sheet 2.

F. W. FIX.
MACHINE FOR MOLDING CONFECTIONS.

No. 518,059. Patented Apr. 10, 1894.

WITNESSES:
C. L. Bendixon
J. J. Laass

INVENTOR:
Frederick W. Fix
By E. Laass
his ATTORNEY.

(No Model.) 4 Sheets—Sheet 3.
F. W. FIX.
MACHINE FOR MOLDING CONFECTIONS.
No. 518,059. Patented Apr. 10, 1894.
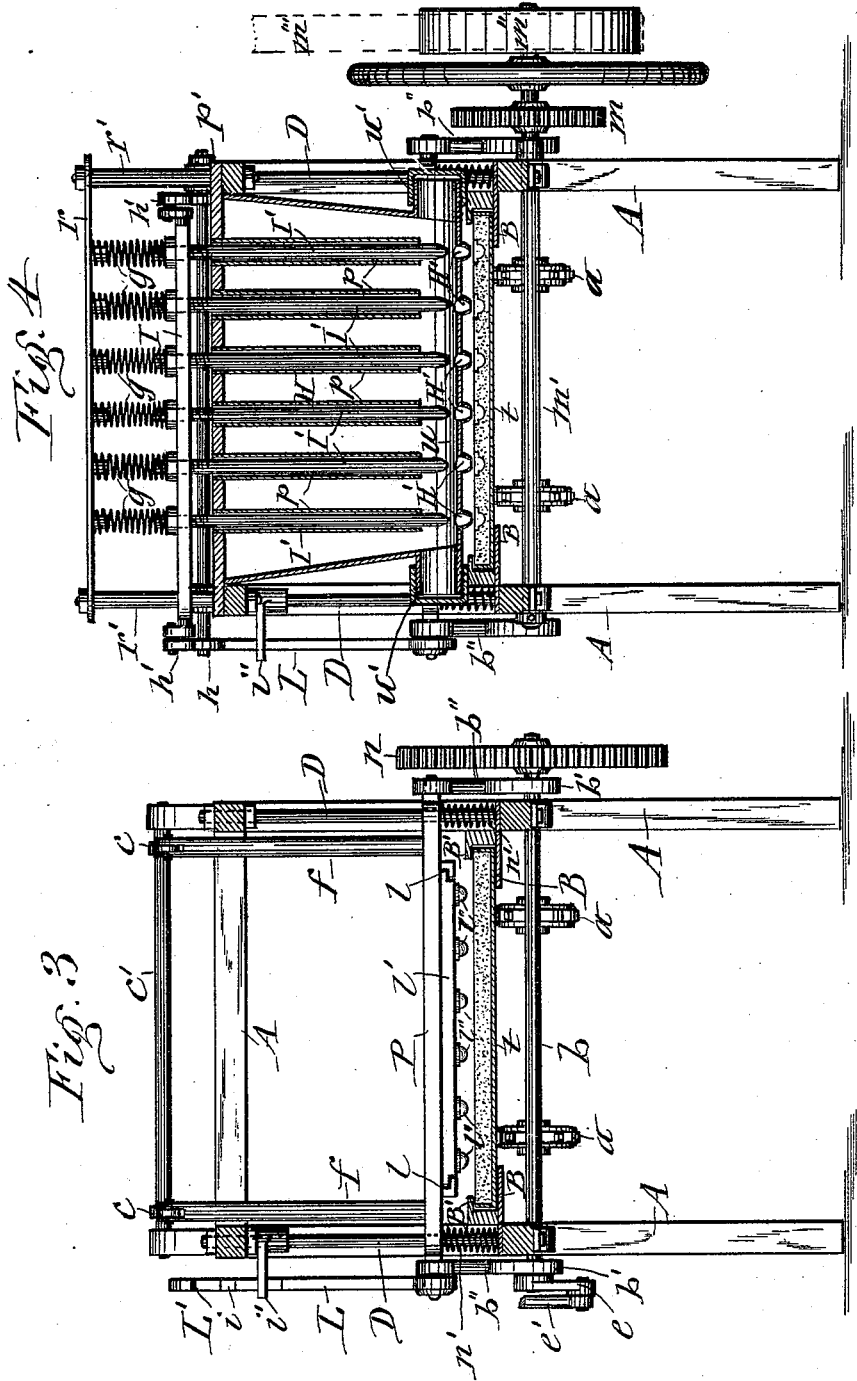
WITNESSES:
INVENTOR
Frederick W. Fix
By E. Laass
his ATTORNEY.

(No Model.)　　　　　　　　　　　　　　　　　　4 Sheets—Sheet 4.
F. W. FIX.
MACHINE FOR MOLDING CONFECTIONS.

No. 518,059.　　　　　　　Patented Apr. 10, 1894.

WITNESSES:　　　　　　　　　　　　　　INVENTOR:
C. L. Bendixon　　　　　　　　　　　　Frederick W. Fix
J. J. Laass　　　　　　　　　　　　　　By E. Laass
　　　　　　　　　　　　　　　　　　　　his ATTORNEY.

UNITED STATES PATENT OFFICE.

FREDERICK W. FIX, OF SYRACUSE, NEW YORK.

MACHINE FOR MOLDING CONFECTIONS.

SPECIFICATION forming part of Letters Patent No. 518,059, dated April 10, 1894.

Application filed June 17, 1893. Serial No. 477,958. (No model.)

*To all whom it may concern:*

Be it known that I, FREDERICK W. FIX, of Syracuse, in the county of Onondaga, in the State of New York, have invented new and useful Improvements in Machines for Molding Confections, of which the following, taken in connection with the accompanying drawings, is a full, clear, and exact description.

This invention consists in a novel organization of a machine designed to form the starch-molds and drop therein the melted sugar or confection material in regular consecutive order and in an expeditious and perfect manner at a minimum expenditure of manual labor.

The invention also consists in certain novel features of the details of the machine all as hereinafter fully described and set forth in the claims.

Figure 1:
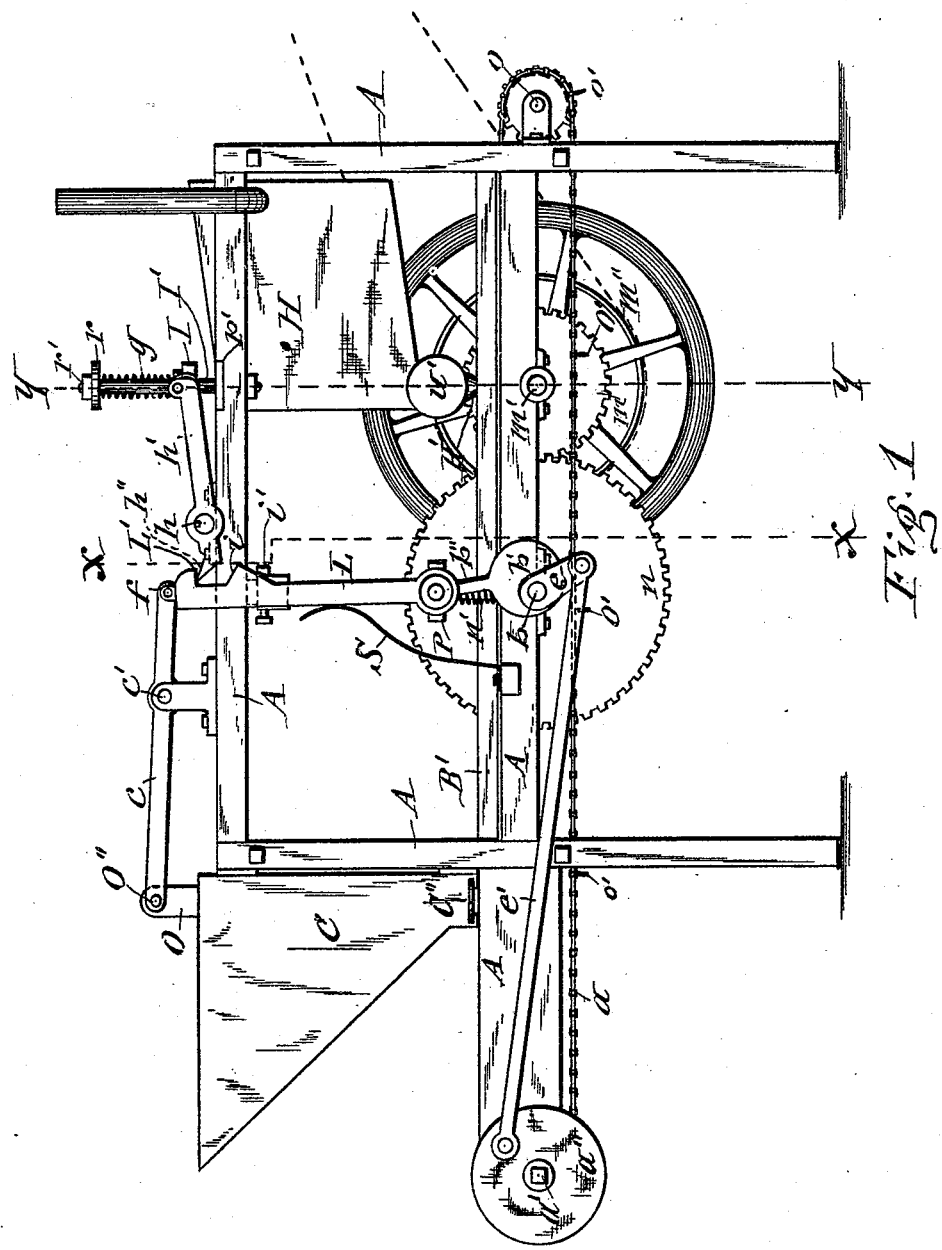
Figure 2:
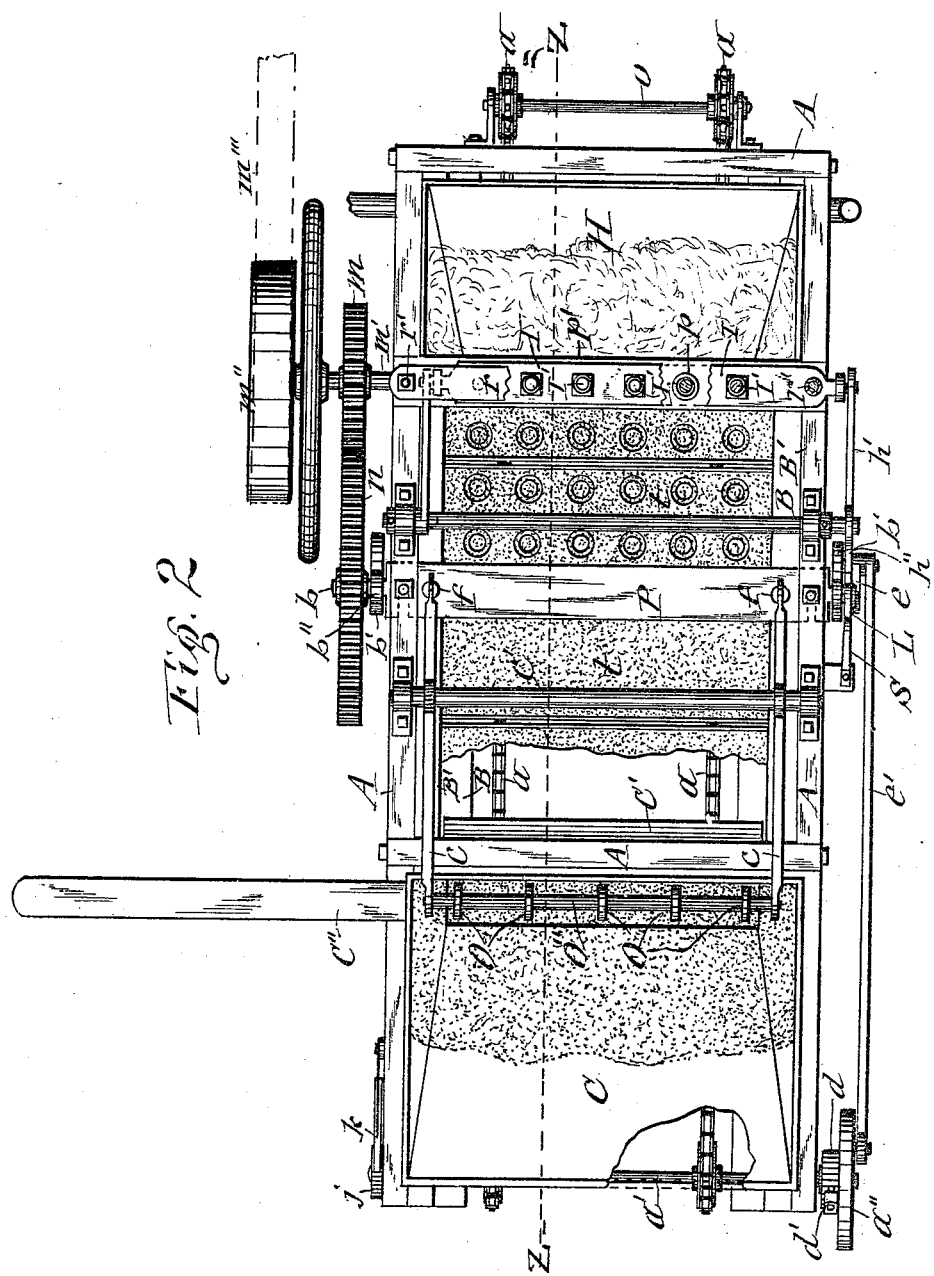
Figure 5:
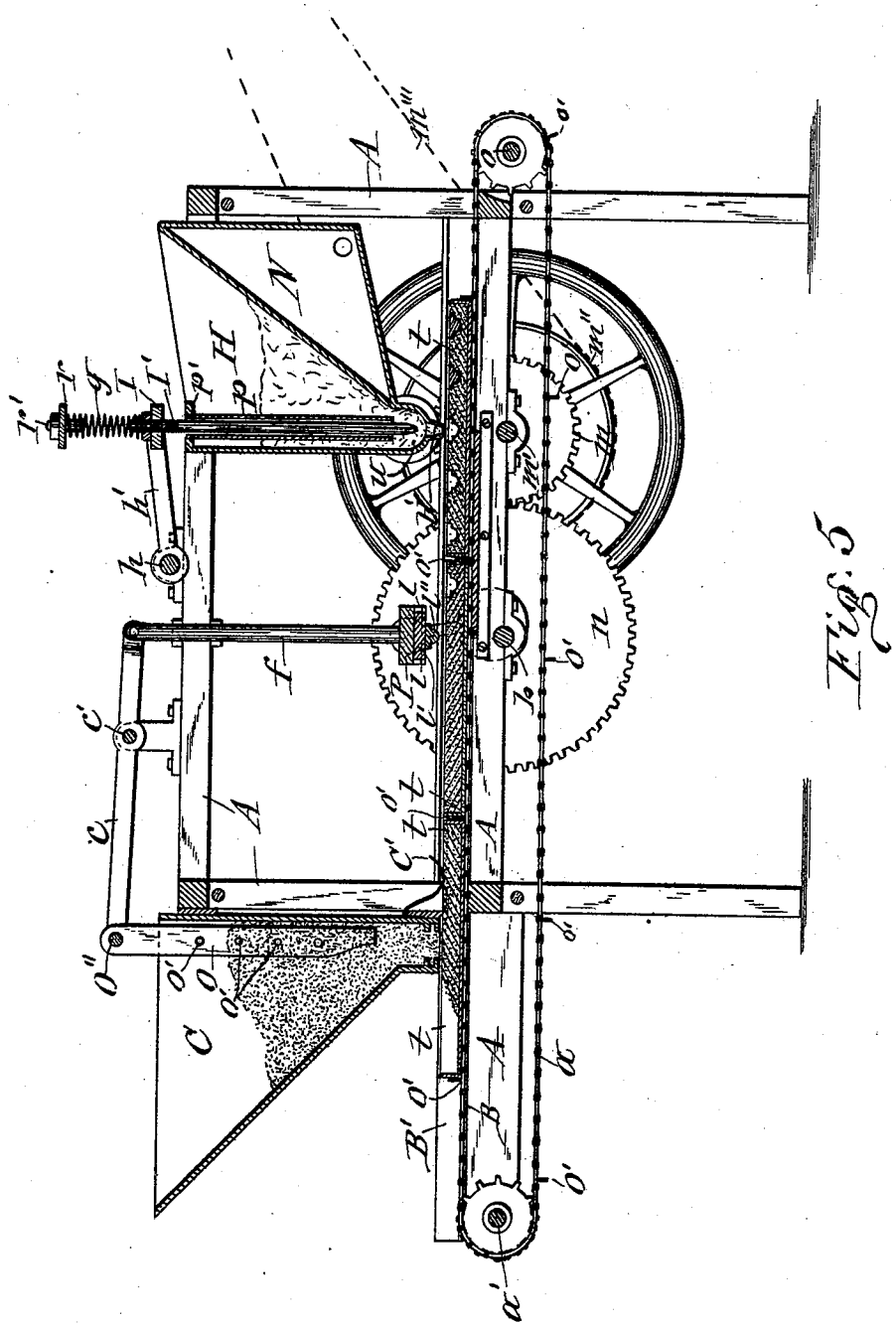

In the annexed drawings Figure 1, is a side elevation of a machine embodying my invention. Fig. 2 is a top plan view of the same. Figs. 3 and 4 are vertical transverse sections respectively on lines $xx$ and $yy$ in Fig. 1, and Fig. 5 is a vertical longitudinal section on line $zz$ in Fig. 2.

Similar letters of reference indicate corresponding parts.

—A— represents the frame of the machine. Said frame is formed with a prolonged horizontal bed —B— for supporting the trays —t—t— in which the starch molds are formed as hereinafter described. Lengthwise of said bed extend the endless conveyers or chains —a— which run on sprocket-wheels fastened to shafts —a'— and o— extending across the ends of the frame and journaled in suitable bearings thereon. Said chains are provided with spurs —o'— by which they engage the ends of the trays mounted on the bed —B—, and, when the machine is in operation, the chains move the trays along the bed —B— from end to end thereof. The sides of said bed are provided with longitudinal guides —B'—B'— which serve to maintain the trays in proper line. The chains or conveyers —a— receive an intermittent longitudinal motion from a rotary shaft —b— which extends across the frame —A—, and is journaled in bearings on the sides of said frame, and has attached to one of its ends a crank —e— which is connected by a pitman —e'— to a crank-disk —a''— mounted loosely on the conveyer-shaft —a'—. A pawl —d'— pivoted to said crank-disk engages a ratchet wheel —d— fixed to the shaft —a'—. The wristpin of the crank-disk is farther from the center of the shaft —a'— than the distance between the wristpin of the crank —e— and its shaft —b— and thus an oscillatory motion is imparted to the crank-disk —a''— which, by means of the pawl —d'— and ratchet-wheel —d—, transmits an intermittent rotary motion to the conveyer shaft —a'—. Another ratchet-wheel —j— is attached to the opposite end of the shaft —a', and a dog —k— pivoted to the frame, and engaging the latter ratchet-wheel serves to prevent retrograde movement of the shaft —a'—.

Over the bed —B— near the end at which the trays —t—t— are introduced, is a hopper —C— for containing the starch from which to form the molds. Said hopper has its discharge opening, extending across the bed —B—, and at a proper elevation to allow the trays —t—t— to pass under the hopper and become filled with the starch issuing therefrom. Along the base of the front of said hopper extends a plate —C'—, which is in such a position as to sweep across the top of the trays as they pass from under the hopper, said plate serving to level the starch in the trays. The discharge opening of the hopper is provided with a gate or slide —C''— to allow said opening to be closed while the machine is at rest or while filling the hopper with starch.

In front of the starch-hopper at a suitable distance therefrom is the printer —P— which forms the molds in the starch. Said printer consists of a vertically movable plate extending horizontally across the frame over the path of the trays —t—t— and sliding on vertical guide-rods —D—, to which they are fitted sufficiently loose to allow the plate a slight lateral rocking motion for the purpose hereinafter explained. The under side of the plate —P— is provided with transverse ways —l—l— in which is removably seated another plate —l'— to which are attached the dies —l''—l''—, which by their impressions in the starch contained in the tray form the molds for the confections. The object of making the die-plate —l'— detachable from the plate —P— is to permit plates with different dies to be used interchangeably. The plate —P— receives its up and down movements by means of eccentrics —b'—b'— attached to the ends of the shaft —b— and having the eccentric rods —b"—b"— connected to the ends of the aforesaid plate.

The shaft —b— may be rotated by any suitable and well known means, preferably by a pinion —m— on a shaft —m'— which has also affixed to it the driving pulley —m"— which by means of a driving belt —m'''— receives motion for the pulley of a suitable motor, not shown. Said pinion —m— meshes with a gear —n— attached to the shaft —b—.

To guard against jarring of the plate —P— incident to the wear of the eccentrics —b'—b'— and its connections, I interpose between said plate and subjacent part of the frame —A— spiral springs —n'—n'— which force the plate upward and thus take up any lost motion that may be incurred by the aforesaid wear.

To prevent the starch from clogging in the hopper —C— I employ in said hopper the agitators —O—O— preferably of the form of vertically reciprocating bars provided with laterally projecting rods —O'— and suspended from a horizontal bar —O"— which is carried on the ends of rock-arms —c—c— attached to a rock-shaft —c'— mounted on the frame —A—. To forward extensions of said rock-arms are connected the upper ends of posts f—f— which are rigidly secured to the plate —P—. The movement of this plate imparts a rocking motion to the arms —c—c— which in turn transmits a vertical reciprocating motion to the agitator-bars —O—O—. The rocking of the arms —c—c— imparts a slight rocking motion to the printing plate —P— and thus causes the dies —l"— to slightly crowd the starch rearward in making the impressions therein, thereby obviating the liability of disturbing the impressions previously made in the starch by the said dies.

A suitable distance from the front of the printing bar —P— is the hopper —H— for containing the melted sugar or confection composition. Said hopper is provided with a steam-jacket —N— to keep the contents of the hopper in their requisite plastic condition. The bottom of this hopper I form with a trough —u— to which are attached the discharge nozzles —H'—H'—. Across the top of the hopper extends a bar —I— which is pivoted at opposite ends to the free ends of arms —h'—h'— extending from a rock-shaft —h— mounted in bearings on top of the frame —A—. On the bar —I— are hung the plungers —I'—I'—, the lower ends of which are adapted to enter the nozzles —H'—H'— and push the confection material through the same. The plungers pass through tubes —p—p— attached to a cross-bar —p'— which is fastened to the top of the frame —A—. Said tubes serving to guide the plungers. Over the bar —I— is another bar —r—, which is fastened to the tops of posts —r'—r'— rising from the frame. Between the bottom of the bar —r— and upper ends of the plungers —I'—I'—, are interposed spiral springs —g—g—, which depress said plungers. For raising the plungers I provide one of the arms —h'— with a rearwardly extending heel —h"— and connect the pitman L to the eccentric rod —b"— at the same side of the machine. This pitman thus receives a vertically reciprocating motion. The upper end of said pitman is provided with a shoulder —L'— by which it is adapted to bear on top of the heel —h"— and draw it down in the downward movement of the pitman. A spring —S— attached to the frame and bearing on the back of the pitman forces the same toward the heel —h"—. The pitman is also provided with a throw-off cam —i— which during the downward movement of the pitman comes in contact with a stationary lug —i'— and thereby pushes the pitman rearward and out of engagement with the heel —h"—. In the downward movement of the pitman the shoulder —L'—thereof first engages the heel —h"— and thereby causes the arms —h'—h'— to lift the plungers, —I'—I'—. The subsequent release of the heel —h"— from the pitman allows the springs —g—g— to depress the plungers and cause the same to force the confection material through the nozzles —H'—H'— and into the starch molds formed in the tray —t—, by the printer —P— as hereinbefore described. Each successive movement of the conveyers —a—a— carries the trays —t—t— forward a proper distance to cause the printer —P— to make the impressions of its dies in the bed of starch in the tray, in rows uniform distances apart, and the nozzles —H'—H'— of the hopper —H— are at such a distance from the printer —P—, and the movement of the plungers —I'—I'—, is so timed as to cause each row of molds to be filled with the confection material during the transit of the trays —t—t— through the machine.

In order to allow the interior of the trough —u— and the lower ends of the plungers —I' —I'— to be conveniently cleaned when required, I provide the ends of said trough with removable caps —u'—u'—.

What I claim as my invention is—

1. In combination with the bed, and trays movable on said bed, a starch-hopper over the bed communicating with the subjacent tray, agitators in the hopper, a vertically movable printing plate in front of said hopper, and rock-arms transmitting motion from said printing plate to the agitators as set forth.

2. In combination with the elongated bed, and trays mounted movably on said bed, a starch-hopper over one end of said bed communicating with the subjacent tray, a vertically movable printing plate over the path of the trays in front of the starch-hopper, agitators in the hopper, rock-arms transmitting motion from the printing plate to the agitators, a starch leveler between said hopper and printing plate, a hopper for confection material in front of the printing-plate provided with discharge-nozzles, and plungers, in the latter hopper forcing the confection material through the nozzles substantially as set forth.

3. In combination with the frame —A—, bed —B—, trays—t—, and endless conveyers —a—, the starch hopper —C—, the vertically movable plate —P—, rotary shaft —b—, eccentric —b'—, eccentric-rod —b''— connecting the aforesaid plate to the eccentric, the rock-arms —c—c— actuated by the plate —P—, and the agitators —O—, in the starch-hopper and connected to the rock-arms as set forth.

4. In combination with the frame —A—, bed —B—, and trays —t—, the vertically movable plate—P—, dies —P'— on the under side of said plate, the rotary shaft —b— parallel with the plate —P—, eccentrics —b'—, attached to said shaft, and eccentric-rods —b''— connecting the aforesaid plate to the eccentrics substantially as described and shown.

5. In combination with the frame —A—, bed —B—, endless conveyers —a— conveyer shaft —a'—, crank-disk —a''— mounted loosely on said shaft, the ratchet-wheel —d— fixed to said shaft, pawl —d'— pivoted to the crank-disk, the rotary shaft —b—, crank —e—, and eccentrics —b'—b'— fixed to the latter shaft, and the pitman —e'— connecting said cranks, the starch-hopper —C—, starch leveler —C'—, the vertically movable printing plate —P—, eccentric-rods —b''— connecting said plate to the eccentrics —b'—b'—, the agitators —O—in the starch-hopper, the rock-arms —c—c— connected at one end to the agitators, and the posts —f—f— rigidly secured to the printing plate and connected to the aforesaid rock-arms, whereby said plate receives a tilting movement in making the impressions in the starch and obviates disturbances of previously made impressions as set forth.

6. In combination with the frame and bed, the hopper—H—provided with nozzles—H'—H'—, the bar —I—, plungers —I'—I'— hung on said bar, springs —g—g— depressing said plungers, the rock-shaft —h—, arms h'—h'— on said rock-shaft connected to the bar —I—, the heel —h''— on one of said arms, the rotary shaft —b—, eccentrics —b'— fixed to said shaft, eccentric rods —b''—, the pitman —L— connected to said eccentric rod and provided with the shoulder —L'— adapted to engage and draw down the heel —h''— the throw-off-cam —i— on said pitman, the stationary lug —i'—in the path of said cam, and a spring pushing the pitman toward said heel substantially as set forth.

7. The combination, with the hopper—H—, of the trough —u—, nozzles —H'—H'— on the bottom of said trough, and plungers—I'—I'— entering said nozzles, of the caps —u'—u'— removably connected to the ends of the trough —u—, substantially as and for the purpose set forth.

In testimony whereof I have hereunto signed my name this 13th day of June, 1893.

FREDERICK W. FIX. [L. S.]

Witnesses:
JOHN J. LAASS,
C. L. BENDIXON.